Dec. 31, 1946.  W. HELMORE  2,413,350
AIR INTAKE PIPE FOR MOTOR WATERCRAFT
Filed Aug. 11, 1943  3 Sheets-Sheet 1
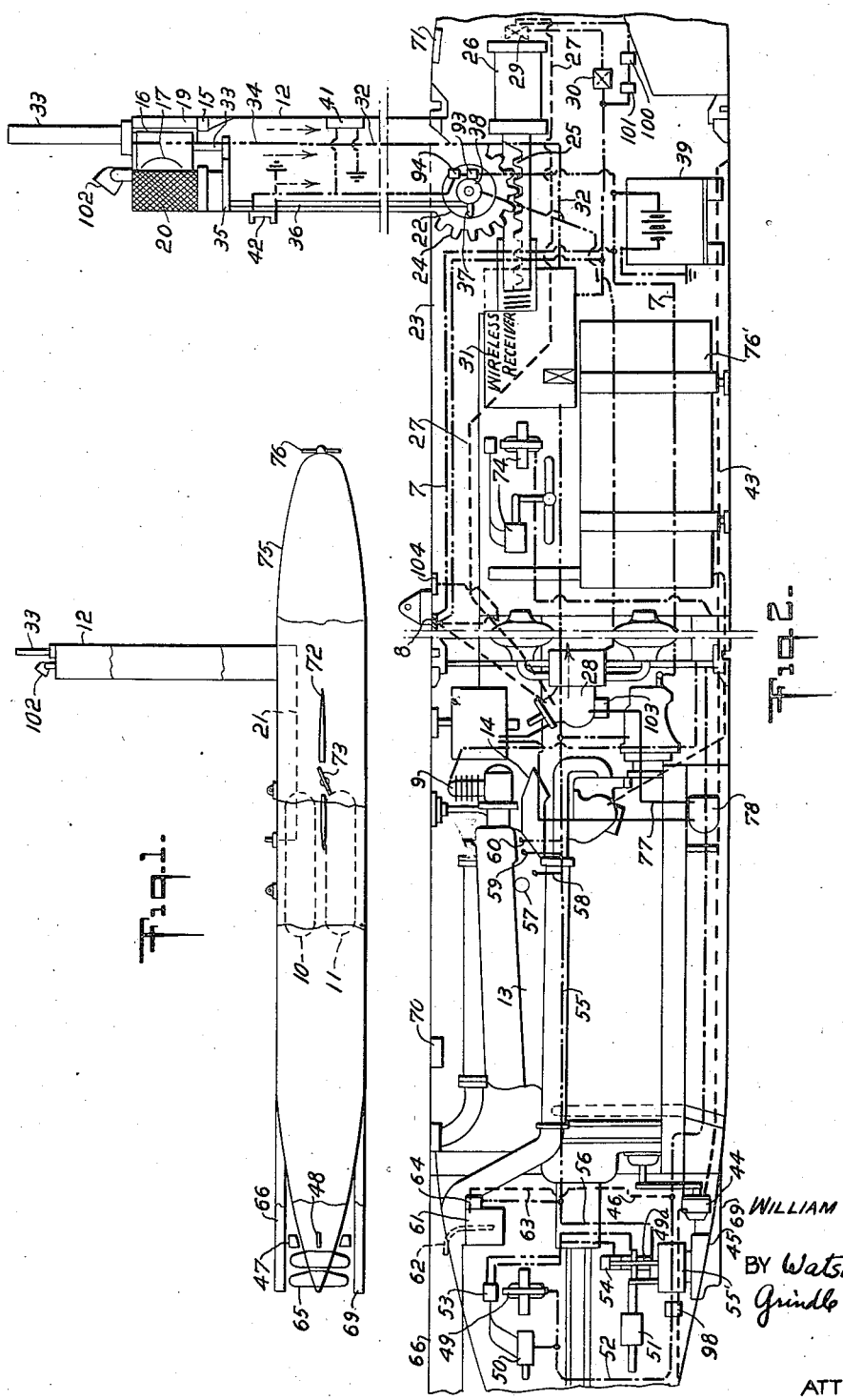
INVENTOR
WILLIAM HELMORE
BY Watson, Cole,
Grindle & Watson
ATTORNEYS

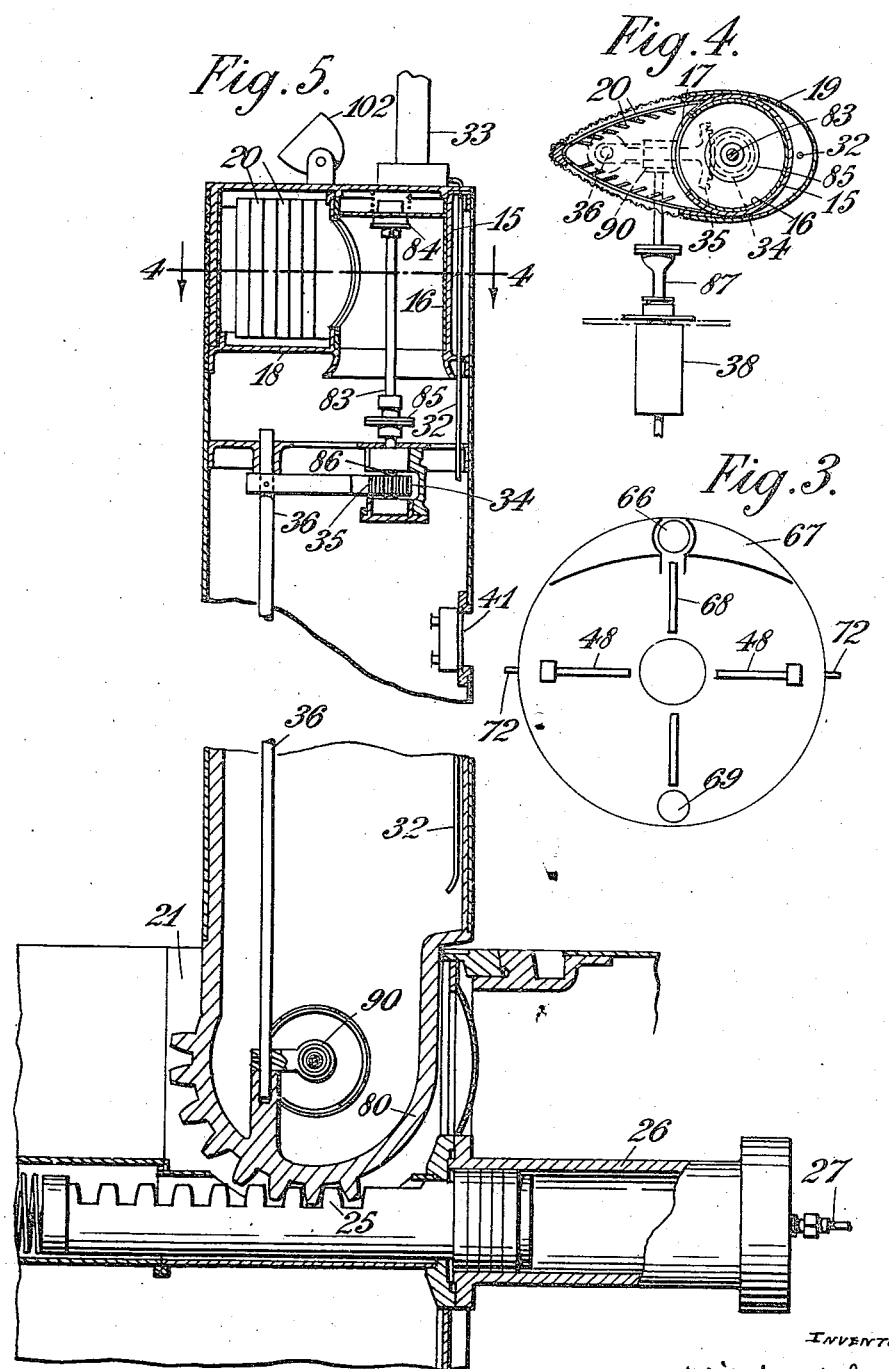

Dec. 31, 1946.  W. HELMORE  2,413,350
AIR INTAKE PIPE FOR MOTOR WATERCRAFT
Filed Aug. 11, 1943  3 Sheets-Sheet 3

INVENTOR
William Helmore
By Watson, Cole, Grindle &
Watson
ATTYS

Patented Dec. 31, 1946

2,413,350

UNITED STATES PATENT OFFICE 2,413,350

AIR INTAKE PIPE FOR MOTOR WATERCRAFT

William Helmore, Cambridge, England

Application August 11, 1943, Serial No. 498,244
In Great Britain August 11, 1942

10 Claims. (Cl. 114—21)

This invention relates to engine driven watercraft, such as torpedoes, or any other craft which is liable, when travelling along the water surface, to be partly or wholly submerged by passage through a wave.

It is usual for the engine of a torpedo to receive its supply of air for the combustion of the fuel solely from a reservoir within the torpedo; but the usual range for a torpedo is from 1½ to 4 miles, and thus the size of the reservoir can be kept within reasonable limits. One of the objects of the present invention is to provide means whereby the effective range of a torpedo may be considerably increased.

According to this invention, a watercraft driven by an internal combustion engine comprises a hull enclosing said engine, an air-intake pipe for said engine projecting above said hull, a valve associated with said intake-pipe and operating gear for said valve. Preferably water-operated control means are provided for said valve, which are arranged automatically to close the valve after the water is at a predetermined level above the hull. Thus, when the watercraft is travelling along the surface, it receives its supply of air from the atmosphere, but should the craft become submerged, the water is prevented from entering the air-intake pipe by the closing of said valve. There may also be provided wireless control means and/or means for said air-intake valve.

The craft may also be provided with a valve-controlled compressed air supply within said hull, the valve control of the compressed air being so related to the valve control of the air-intake pipe that when or after the latter is closed, the compressed air is released for use by the engine. Thus, the craft can travel in and out of the waves and above or below the surface, utilising the atmosphere for its engine when clear of the water without fear of the induction system being smothered and the range of the torpedo may be considerably increased beyond the usual, since the first and greater part of the travel of the torpedo may be arranged to take place along or near the surface of the water when the engine receives the greater part of the air for combustion from the atmosphere, while the torpedo may be permanently submerged during the last part, e. g. the last mile or so of the journey, when the engine relies on the air reservoir within the torpedo.

Preferably the air-intake pipe is movable from a retracted position within the hull to a position projecting above the hull and vice versa, and hydraulic pressure-controlled operating mechanism may be provided for effecting said movement. Alternatively or additionally wireless control means and/or time control means may be provided for operating said pipe. For example, a hydraulic pressure-control is arranged initially to effect movement of the intake pipe into erect position, e. g. after launch from the aircraft or ship or other launching station, whereafter the wireless control is arranged to move it into either position.

The operating gear for the air-intake valve may be under the control of means responsive to the presence of water.

In attacking a moving target, it may not be practicable to make use of the increased range provided by this invention without the use of a remote control for navigating the craft during its journey towards the target. Thus, in any of the arrangements referred to above, a wireless control mechanism may be provided for navigating the craft. Thus, in the case where the torpedo is provided with elevators and a rudder controlled by wireless, the valve for the air intake pipe is closed by submersion of the craft. By this means the torpedo or the like, as described, may be guided on to its target from an aircraft which is preferably a faster and more defensible type than the aircraft or ship from which it has been launched, the launching being effected out of range of the guns situated on the target, and the torpedo being submerged before reaching the target in order to obtain the most effective hit.

The control means for the valve of the air intake pipe may be mounted on the air intake pipe, so that the valve is closed at a predetermined level of the water from the hull and is opened when the water is below that level.

The aforesaid hull enclosing said engine may be arranged to provide an air-space from which the engine is fed, and the air intake pipe and compressed air reservoir may feed said air space, valve mechanism being associated with said compressed air reservoirs, incorporating means responsive to the pressure in the air-space, whereby a fall of pressure in the air-space consequent upon the closing of the air intake valve opens the compressed air valve. Thus, the compressed air may be indirectly controlled by the submersion of the craft.

It will be appreciated with this arrangement for a short period of immersion, e. g. when passing through a wave, sufficient air is available in the hull to render it unnecessary to use the compressed air, and the latter is only released when the depression reaches a predetermined limit.

The pressure responsive device may thus be set to open the compressed air only at a considerable depression. Under such circumstances the correct fuel-air ratio to the engine may be maintained by a device such as an automatic altitude control for a carburettor as used in aircraft.

Other features of the invention include stabilising vanes on the hull for maintaining the air-intake pipe erect, the provision of means for ejecting a visible trail from the craft under wireless control, adjustable pressure-responsive device for moving the elevators in a position to maintain the craft submerged at a predetermined depth, and a wireless control for presetting such a device, a time control for moving the elevators into a position to surface the craft after a predetermined time limit, and a shield over the propellers so as to maintain their efficiency while the craft is surfaced.

The following is a description of a wireless-controlled torpedo according to this invention, reference being made to the accompanying drawings, in which:

Figure 1 is an outside elevation of a wireless-controlled torpedo;

Figure 2 is a vertical longitudinal cross-section through certain parts of the torpedo on an enlarged scale;

Figure 3 is a stern view of the torpedo.

Figure 4 is a vertical section through the air-intake assemblage;

Figure 5 is a vertical section along a plane at right-angles to Figure 4, and

Figure 6:
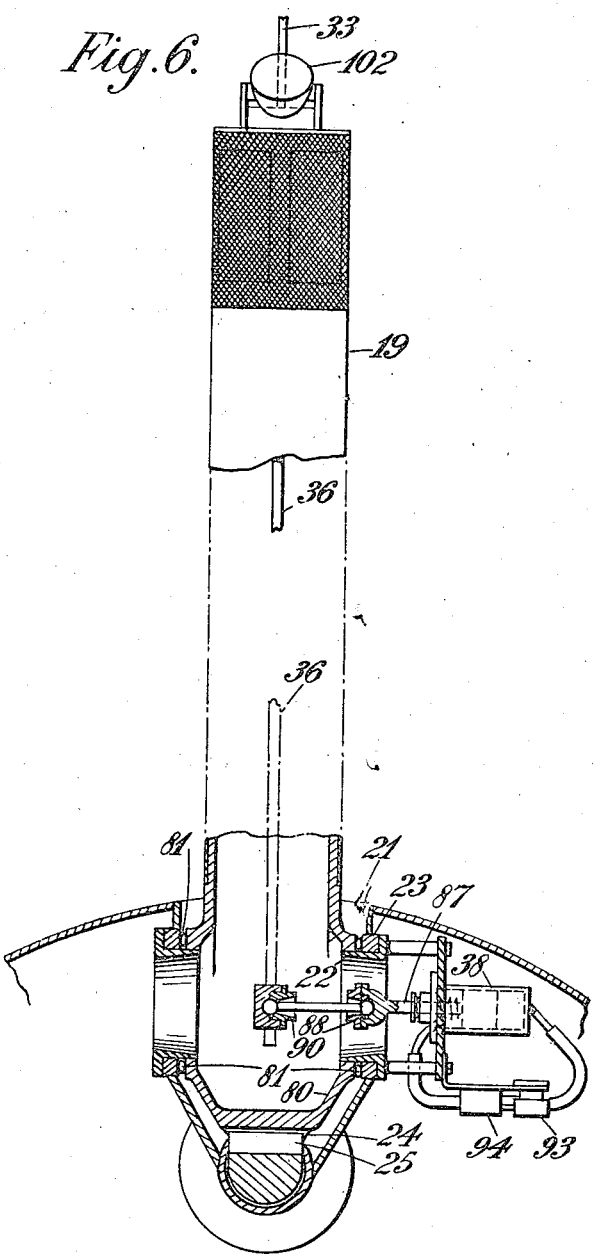
Figure 6 is a section on the line 6—6 of Figure 4.

The torpedo shown in the drawings is suitable for launching from the air and when launched its movement may be controlled by wireless, for example, its course towards the target can be maintained by rudder control, it may be partly or wholly submerged and may be caused to emit an identifying trail, all under the control of a wireless transmitter.

As already indicated, it has heretofore been usual for an engine of a torpedo to receive its air supply only from compressed air storage vessels within the torpedo, and thus the range of the torpedo has been limited.

In the arrangement shown in the drawings in addition to the air being supplied by compressed air reservoirs such as shown at 10 and 11, there is provided an air-intake pipe 12 which feeds the interior of the torpedo from which the engine 13 draws its supply through an air-intake pipe 14. The air storage reservoirs, only two of which are shown, 10 and 11, may be maintained at predetermined different pressures, according to the mechanisms which are required to be operated by them. This is arranged through reducing valves, so that one reservoir is at 2,000 lbs. per sq. inch another at 60 lbs. per sq. inch and another at 40 lbs. per sq. inch. The high pressure reservoir is initially charged through a connection 104 from external means and the supply to the lowest pressure reservoir through the reducing valve mechanism is supplemented by an engine driven compresser 9.

The intake pipe 12 is streamlined in cross section except at its upper end where it is provided with a cylindrical extension 15 in which is rotatably mounted a sleeve valve 16. The cylindrical extension is cluosed at the top and is provided with a rearward lateral opening with which an aperture 17 in the sleeve valve may be brought to register.

The cylindrical extension 15, the sleeve valve 16 and the wall 18 which connects the cylindrical extension with the main streamlined section, is surrounded by a streamlined fairing 19, the trailing part of which is slotted and covered with a wire mesh screen 20 opposite the intake aperture 17. Internally-directed vanes 92 are associated with the slots so that the passage of the fairing through the water induces pressure conditions tending to prevent the water from flowing into the air-intake pipe when the pipe is submerged. The air-intake assemblage is arranged to swing downwardly into a trough 21 formed in the hull of the torpedo. The bottom end of the streamlined pipe 12 is closed at 80 and hollow trunnions 22 one on each side thereof extend through the side walls 23 of the trough, a suitable gland 81 being provided between these parts.

A gear track 24 is formed on the wall 80 and is engaged by a rack 25 operated by a servo-motor 26. The servo-motor is energised through a pipe line 27 (see Figure 2) from the high pressure side of a reducing valve 28, fed by one of the aforesaid air reservoirs. The valve gear 29 of the servo-motor is operated by control mechanism 30 which is energised by a signal from a wireless receiver 31. The receiver is connected by a lead wire 32, to an aerial 33, mounted at the top of the aforesaid fairing 19.

A pressure-controlled trip switch 8 is so arranged that when a predetermined hydraulic pressure is first reached e. g. on launch, a circuit is closed and an electric impulse passed through a line 7 to the controller 30 which causes the servo-motor 26 to raise the air-conduit. After the first trip action the switch becomes inoperative, whereafter the control of the air-intake pipe may be entirely by the wireless receiver. Alternatively, or in addition, any known form of time control mechanism 100 may be provided for retracting or erecting the air-intake pipe which may be preset by wireless control mechanism 101.

The sleeve valve 16 is connected through a flexible joint 84 to one end of a rotatably-mounted shaft 83 the other end of which is connected through a flexible joint 85 to a stub shaft 86. The stub shaft carries a pinion 34 which is engaged by an arcuate rack 35. The rack is mounted on a shaft 36 which extends downwardly through the streamlined intake-pipe 32, and is mounted in the bearing 37 carried by the wall 80. The shaft may be rotated by a servo-motor 38 (see Figure 6), with an operating rod 87 which in its turn is connected through universal joints 88 and 90 with a lever arm 91 secured to the shaft 36. The motor is energised from a battery 39 through two switch mechanisms 41 and 42 connected together in parallel, in circuit with a spring-returned solenoid mechanism 94 which operates the motor valve 93, one terminal of each of which switch mechanisms, and of the battery, are shown earthed for convenience. The switch mechanism 41 is controlled by hydraulic pressure, so that when it meets the water due to the torpedo being submerged or due to a wave passing over it, the sleeve valve 17 is moved into a closed position, whereas when the switch mechanism is clear of the water, the motor is reversed and the valve again opens. The switch mechanism 42 is shown in parallel with the switch mechanism 41 and is of a kind in which when two electrodes are bridged by the water, a circuit is established so as to close the valve, and when free of the water is reversed so as to open the valve. These duplicated arrangements which may, however, be used alternately, prevent an undue amount of water entering the air-intake pipe, and any water which does flow down the pipe collects at the bottom of the hull and is drawn away through a conduit 43 by a bilge pump 44 to a suitable outlet 45 in the hull, the bilge pump being driven through suitable transmission 46 from the engine.

A known form of wireless apparatus may be employed for navigating the torpedo; for example, the rudders 47 and elevators 48 may be controlled by gyro mechanism 49 and 49A respectively, which control a rudder servo-motor 50 and elevator servo-motor 51. Both the gyro mechanisms and the servo-motors are energised through a pipe-line 52 from a low pressure reservoir. To effect an alteration in course, the gyro mechanism is caused to precess by precession motors 53 and 54, and which are conditioned by signals received by the wireless receiver 31 and conducted to them by lead-lines 55. The torpedo may have a buoyancy of approximately 5% and the elevators may be automatically controlled by an adjustable pressure-responsive device 55' so that the elevators may be set at such an angle as to overcome the buoyancy of the torpedo and maintain it at a predetermined depth. Since the torpedo may be no longer under wireless control when the aerial is submerged, a time control 98 may be associated with the elevators so as to bring the torpedo to the surface after a predetermined interval. Means may be provided for setting this time control by a wireless signal prior to the torpedo being submerged. The adjustment of the pressure-responsive device may be effected by yet another signal received by the wireless receiver and conducted to a setting motor associated with the pressure-responsive device through a lead-line 56. By these means the torpedo may be so controlled by wireless as to proceed along the water surface or at a predetermined depth beneath it on a predetermined course for a predetermined time.

A predetermined lag of, say, two seconds may be arranged to take place between the time when the air valve is closed and when the compressed air is released during which time a depression of say 14 inches of mercury is reached due to the consumption of air by the engine. A pressure-responsive device 103 is present so as not to release the compressed air until this predetermined depression is reached. The carburetter may be provided with a known form of altitude or automatic control such as is used in aircraft, whereby the air-fuel mixture is maintained at a required value, during this variation in pressure and in other conditions. By these means the engine is enabled to run on the air present in the air space within the hull for considerable periods without drawing upon the compressed air supply. The throttle may also be wireless-controlled; for example, it may be provided with devices 58, 59, 60, responsive to three different signals and which will move the throttle into positions corresponding with full speed, half speed and stop.

In order that the track of the torpedo may be readily discerned from the controlling aircraft, a trail such as a plume of smoke or vapour may, under wireless control, be ejected into the atmosphere, or a suitable substance be injected into the water through the exhaust system, so as to colour the water. For this purpose, there is shown in the drawings, a reservoir 61 provided with the smoking-forming fluorescent or colouring matter, and dipping into this reservoir is an ejection pipe 62, whereas the top of the reservoir may be subjected to internal pressure from a pipe-line 63 leading to the low-pressure source, which pipe is provided with a valve controlled by a mechanism 64 responsive to a predetermined signal received by the wireless receiver 31.

When the torpedo is used for the type of operation necessitating its travelling along the surface, conditions may arise in which there is not sufficient water cover for the propellers 65, since there is a tendency for air to be drawn down. To overcome this difficulty, the exhaust pipe 66 may have slid over it a hollow guard member 67, which may be clipped to a suitable bracket 68 on the torpedo. A tubular keel 69 is arranged to extend beneath the propellers to balance the exhaust pipe 66, and to provide the glancing means referred to later.

It is desirable for starting purposes to scavenge explosive fumes and to feed hot air to the interior of the torpedo before launch, and for this purpose, two self-sealing openings 70 and 71 may be provided, to which hot-air inlet and outlet pipes may be connected.

The hull of the torpedo may be provided with roll-damping vanes 72, and gyro-controlled stablising vanes 73, the gyro-control mechanism being shown at 74. In order to prevent these vanes from being unduly stressed during launching, they may be arranged to be projected out of the recess after launch by means of a motor which raises the air-conduit 12.

The hull may be formed in three sections, the forward section 75 constituting the usual warhead provided with the pistol 76, the mid-section containing the aforesaid air-storage reservoirs, wireless receiver 31, battery 39 and fuel tank 76', and also the aforesaid air-intake pipe 12 and the mechanism for raising and lowering it, and the rearward section containing the engine 13, the propellers, rudders, elevators and control gear.

As indicated above, the air supplied to the engine when the air conduit is closed is from the air remaining in the body of the torpedo. As this air is used up and the pressure falls, a pressure-controlled valve associated with the low-pressure reservoir at 60 lbs. per square inch is opened automatically to maintain the pressure within the body at the pre-arranged level.

The pressure-reducing valves may be oil-heated to prevent icing up, oil being supplied through a conduit 77 from the main lubricating pump 78. The engine may be provided with a starting motor of the "Startex" type, which prevents the engine from stalling; alternatively, it may be provided with an ordinary starter motor and either type may be wireless-controlled in known manner or directly controlled before launching of the torpedo.

There may also be associated with a torpedo as set out above, means for imparting a rapid bodily movement to it, at a required moment, in an upward direction, thereby causing it to leave the water, and by these means the torpedo may be arranged to leap obstructions such as booms surrounding warships. This may be effected either by the aforesaid wireless control on the elevators, so that the torpedo is first put into a dive and then into a rapid climb, or by the provision of an explosive charge in a suitable compartment disposed beneath the hull, which may be arranged to be fired under wireless control.

As indicated above, the forward part of the torpedo may comprise a warhead of the usual kind, but alternatively, the head may be arranged automatically to be shot away from the other part of the torpedo at a required moment. For this purpose, the head of the torpedo may be provided with a piston-like portion which engages the cylindrical part of the torpedo casing, the base of which piston may contain both the propelling charge for ejecting it from the cylinder and a further charge to operate in the manner of a rocket during its passage through the air.

For operating at night, the craft may be provided with means 102 for directing a beam of light or of infra-red rays in a direction which is only discernible from the controlling aircraft, which means may be controlled by a gyro so as to maintain the beam at the desired angle.

Thus, in the case where the torpedo is launched and controlled from the air, the operator is able to determine the line of track of the torpedo by its wake and/or exhaust bubbles, or as indicated above, he may operate at will a radio control to cause the craft to emit a smoke or other identifiable trail. When operating at night the operator may be positioned so as to be in the area of reflected moonlight from the water surface so that the outline of the target is rendered visible, and the course and position of the torpedo may be determined by means of the aforesaid upwardly-directed light beam upon it or by means of the aforesaid fluorescent trail, which thus enables the torpedo to be steered towards the target under wireless control.

Having set the torpedo on a course in line with the target, the operator may either leave it on that course or at the surface, or may cause it to submerge by the radio means to a controlled depth before striking the target. Should the target, however, be surrounded by low booms or protective nets, the operator can employ a separate radio control for said elevators and said adjustable vanes, in order to cause the torpedo to adopt a stern-down attitude to the surface in order to glance over the obstruction, the nose and keel being suitably shaped for this purpose, or he may operate the elevators so that the torpedo first goes into a dive and then a steep angle climb, leaving the water under its own momentum so as to porpoise over the said obstruction. Alternatively, he may operate by radio means an explosive or other force within the torpedo so as to cause it or that part of it carrying the explosive charge, to leap over and surmount the obstruction.

A torpedo suitable for carrying by a heavy bomber is 30 ft. long and may have an air intake conduit 7 ft. long. The fuel supply for the engine may be sufficient to give it a surface run of 50 miles, and the air supply is sufficient to give a submerged run of 2 miles.

I claim:

1. In a remotely-controlled submersible water craft having a hull enclosing an internal combustion engine and depth controlling means responsive to remote control signals; the combination of an air intake pipe projecting upwardly from said hull for a substantial distance, whereby said craft may run with the hull submerged and the intake pipe projecting above the surface; a valve in said air intake pipe controlling the admission of atmospheric air into the hull; and means responsive to changes in water pressure due to depth of running brought about by said remote control, for operating said air valve.

2. In a remotely-controlled submersible craft having a hull enclosing an internal combustion engine and depth controlling means responsive to remote control signals; the combination of an air intake pipe projecting upwardly from said hull for a substantial distance, whereby said craft may run with the hull submerged and said intake pipe projecting above the surface; a valve in said air intake pipe controlling the admission of atmospheric air into the hull; means responsive to depth of running brought about by said remote control, for operating said air valve; a pressure reservoir adapted to feed gaseous fluid for supporting combustion of the fuel into the interior of the hull; a valve for controlling the discharge of said pressure reservoir; and means responsive to the pressure in the hull arranged to open said last named valve upon a predetermined reduction of pressure in the hull.

3. In a remotely-controlled submersible craft having a hull enclosing an internal combustion engine and depth controlling means responsive to remote control signals: the combination of an air intake pipe movable between a retracted position in relation to the hull and a position wherein it projects upwardly from the hull a substantial distance, whereby the craft, if desired, may run with the hull continually submerged; a valve in said air intake pipe controlling the admission of atmospheric air into the hull; means responsive to depth of running brought about by said remote control, for operating said air valve; and means responsive to remote control signals for moving said intake pipe in either direction.

4. In a remotely-controlled submersible craft having a hull enclosing an internal combustion engine and depth controlling means responsive to remote control signals: the combination of an air intake pipe movable between a retracted position in relation to the hull and a position wherein it projects upwardly from the hull a substantial distance, whereby the craft, if desired, may run with the hull continually submerged; a valve in said air intake pipe controlling the admission of atmospheric air into the hull; means responsive to depth of running brought about by said remote control, for operating said air valve; and time delay means responsive to the remote control means adapted to move said air intake pipe to an erect position.

5. In a remotely-controlled submersible craft having a hull enclosing an internal combustion engine and depth controlling means responsive to remote control signals: the combination of an air intake pipe movable between a retracted position in relation to the hull and a position wherein it projects upwardly from the hull a substantial distance, whereby the craft, if desired, may run with the hull continually submerged; a valve in said air intake pipe controlling the admission of atmospheric air into the hull; means responsive to depth of running brought about by said remote control, for operating said air valve; a hydraulic pressure-responsive means adapted to control the means for moving the air intake pipe, so that it is moved to an erect position when running conditions result in a predetermined external hydraulic pressure; and means responsive to remote control subsequently to move the air intake pipe in either direction.

6. In a remotely-controlled submersible craft having a hull enclosing an internal combustion engine and depth controlling means responsive to remote control signals: the combination of an air intake pipe movable between a retracted position in relation to the hull and a position wherein it projects upwardly from the hull a substantial distance, whereby the craft, if desired, may run with the hull continually submerged; a valve in said air intake pipe controlling the admission of atmospheric air into the hull; means responsive to depth of running brought about by said remote control, for operating said air valve; a hydraulic pressure-responsive means mounted on the intake pipe so that the valve is closed to a predetermined level of water from the hull, when the running conditions maintain the end of the pipe above the water and is opened when running conditions result in the water being below said predetermined level.

7. In a remotely-controlled submersible craft having a hull enclosing an internal combustion engine and depth controlling means responsive to remote control signals: the combination of an air intake pipe movable between a retracted position in relation to the hull and a position wherein it projects upwardly from the hull a substantial distance whereby the craft, if desired, may run with the hull continually submerged, a valve in said air intake pipe controlling the admission of atmospheric air into the hull; means responsive to depth of running brought about by said remote control, for operating said air valve; and roll-damping vanes on said hull adapted to maintain said air intake pipe in an upright position.

8. In a remotely-controlled submersible craft having a hull enclosing an internal combustion engine and depth controlling means responsive to remote control signals: the combination of an air intake pipe movable between a retracted position in relation to the hull and a position wherein it projects upwardly from the hull a substantial distance, whereby the craft, if desired, may run with the hull continually submerged; a valve in said air intake pipe controlling the admission of atmospheric air into the hull; means responsive to depth of running brought about by said remote control, for operating said air valve; elevators associated with the hull; an adjustable time controlled device arranged for operating said elevators so as to maintain the water craft at the required depth and to surface the craft at a predetermined time interval so that the air intake pipe may again become operative.

9. A remotely-controlled submersible water craft comprising radio controlled depth controlling means, a hull enclosing an internal combustion engine, an air intake pipe for said engine projecting above said hull, wireless antennae on said air intake pipe and operatively connected to said radio controlled means, a valve in said air intake pipe, and means responsive to changes of depth of running for operating said valve.

10. A remotely-controlled submersible water craft comprising: a hull enclosing an internal combustion engine; radio controlled depth controlling means for the craft; an air intake pipe for the engine movable between a retracted position in relation to the hull and a position wherein it projects upwardly from the hull a considerable distance, whereby the craft if desired may run with the hull submerged and the intake pipe projecting above the surface; radio antennae on said air intake pipe; radio controlled means for extending and retracting said pipe; a pressure reservoir adapted to supply combustion-supporting fluid for said engine when the air pipe is retracted; radio controlled means for initiating the supplying of said combustion-supporting fluid from the reservoir; and time controlled means for raising said air intake pipe after a predetermined interval so that the latter and said radio antennae may again become operative.

WILLIAM HELMORE.